(12) United States Patent (10) Patent No.: US 7,881,993 B2
Sarkar et al. (45) Date of Patent: Feb. 1, 2011

(54) SYSTEM, METHOD AND COMPUTER PRODUCT FOR OPTIMAL PRICING OF A FINANCIAL PRODUCT

(75) Inventors: Abhinanda Sarkar, Bangalore (IN); Debasis Bal, Bangalore (IN); Awadhesh Kumar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 2012 days.

(21) Appl. No.: 10/814,698

(22) Filed: Mar. 30, 2004

(65) Prior Publication Data

US 2005/0222926 A1    Oct. 6, 2005

(51) Int. Cl.
*G06Q 40/00* (2006.01)
(52) U.S. Cl. ........................................................ 705/35
(58) Field of Classification Search ................... 705/35
See application file for complete search history.

(56) References Cited

U.S. PATENT DOCUMENTS

| 6,049,782 | A | 4/2000 | Gottesman et al. | |
|---|---|---|---|---|
| 2002/0152155 | A1* | 10/2002 | Greenwood et al. | 705/38 |
| 2002/0198822 | A1* | 12/2002 | Munoz et al. | 705/38 |
| 2003/0220867 | A1* | 11/2003 | Goodwin et al. | 705/37 |

FOREIGN PATENT DOCUMENTS

WO    WO 02/10961 A2    2/2002

OTHER PUBLICATIONS

Eric Falkenstein, Integrating quantitative risk-management through economic risk capital, Bank Accounting & Finance v12 n1 pp. 10-21 Fall 1998.*
Melanie Bien, Money: Why be a puppet when you can pull the strings?, Independent on Sunday, Sep. 22, 2002.*
William Kay, Wise up, it's time to play the field, Independent Sep. 21, 2002.*
Alan L. Montgomery, "Implementing Pricing Decision Support Systems for Retail Managers", Oct. 2003.
"Pricing and Revenue Optimization for the Financial Services Industry", Manugistics White Paper, 2001.

* cited by examiner

*Primary Examiner*—Charles R Kyle
*Assistant Examiner*—Seth Weis
(74) *Attorney, Agent, or Firm*—Richard DeCristofaro

(57) ABSTRACT

System, method and computer program product for optimal pricing of financial products. Data related to the financial product is extracted from at least one data source. A structured data file is generated from the data. The structured data file comprises a plurality of attributes and a plurality of price parameters related to the financial product. The plurality of price parameters comprise a price conversion probability measure and a business measure parameter associated with the financial product. Then, the optimal price associated with the financial product is estimated based on the plurality of attributes, the plurality of parameters, the price conversion probability measure and the business measure parameter.

32 Claims, 8 Drawing Sheets

Remove a Variable

Select variable to remove [ ▼ ] [ Remove ]

Add a Variable

Enter the Column Name [          ]

Enter the Table Name [          ]   [ Add ]

Modify Variable Definition

Select Variable [ ▼ ]

Select Variable Type [ ▼ ]

Edit Variable Description [          ]

Continuous/Categorical? [ ▼ ]

Edit Variable Function [          ]

Select Variable Data Type [ ▼ ]

[ Modify ]

Select Global Parameters

Select the following global modeling parameters

- Link Field
- Conversion Flag
- APR
- APR Range In %
  - Maximum:      Minimum:
- Term after Conversion
- Volume after Conversion
- Cost of Funds (In %)
- Fee Income (In $)

[Set Parameters]   [Cancel]

Fig. 7C

Select Business Measure and Variables

1. Select Business Measure
2. Select Test Variable(s)   ☐ APR
3. Enter Confidence Limit       % (Optional; Default:90%)
4. Select Variables for Regression Model ☐ Age
☐ Car_price
☐ Down_rate
☐ FC_lifecycle
☐ Installment_amount
☐ Max_delinquency
☐ MOB_max
☐ No_of_dependants
☐ NOM_employed
☐ Term_of_loan
☐ Total_exposure 5. Select A Segmentation Variable ☐ Car_brand
☐ Customer_type
☐ GBI
☐ Marital_status
☐ Sex

[Build Model>>]   [View Report]   [<<Back to Model Selection]   [Exit]

SYSTEM, METHOD AND COMPUTER PRODUCT FOR OPTIMAL PRICING OF A FINANCIAL PRODUCT

BACKGROUND OF THE INVENTION

The present invention generally relates to pricing of financial products and more particularly to a system, method and computer product for estimating the optimal price of a financial product.

Pricing policies for financial products such as consumer loans, insurance policies and credit cards are typically based on one or more business objectives such as maximizing profits, matching the pricing policies of competitors, achieving target sales figures, etc. In some other cases, pricing policies for financial products may be based on meeting a specific target on return on investment, maximizing revenue, or based on the average industry price for a particular financial product. In general, pricing policies for financial products may be based on several factors, some of which may be conflicting. For example, a pricing policy for a financial product such as a consumer loan is generally subject to several conflicting pressures on its price; the price in this context being the interest rate on the loan. At too low an interest rate, the loan product may not be commercially viable, given its cost or expected margins. At too high a rate, the demand for the loan product may be too low to justify the product. An estimate of an optimal price for a financial product that serves to meet both income and volume targets, is therefore desirable.

A challenge with determining the optimal price of a financial product is that the optimum price is not static and varies with features associated with the financial product, individual customers purchasing the financial product, and market conditions. Therefore, there is a need for an approach for dynamic pricing of variable price financial products that take into consideration current market conditions, is customized to individual customers purchasing the financial product and is receptive to changes in product features and business measure definitions.

BRIEF DESCRIPTION OF THE INVENTION

Embodiments of the invention address this and other needs. In one embodiment of the invention, a method and computer readable medium for estimating an optimal price of a financial product is provided. Data related to the financial product is extracted from at least one of the data sources. A structured data file is generated from the data. The structured data file comprises a plurality of attributes and a plurality of price parameters related to the financial product. The plurality of price parameters comprise a price conversion probability measure and a business measure parameter associated with the financial product. Then, the optimal price associated with the financial product is estimated based on the plurality of attributes, the plurality of price parameters, the price conversion probability measure and the business measure parameter.

In a second embodiment, a system for estimating an optimal price of a financial product is provided. The system comprises a data extraction engine configured to extract data relevant to the financial product from at least one of the data sources. The system further comprises a data definition engine and an optimized price decision engine. The data definition engine is configured to generate a structured data file from the data extracted by the data extraction engine. The structured data file comprises a plurality of attributes and a plurality of price parameters related to the financial product. The plurality of price parameters comprise a price conversion probability measure and a business measure parameter associated with the financial product. The optimized price decision engine is then configured to estimate the optimal price associated with the financial product based on the plurality of attributes, the plurality of price parameters, the price conversion probability measure and the business measure parameter.

In a third embodiment, a method and computer-readable medium for estimating an optimal price of a financial product is provided. The method comprises extracting data related to the financial product from at least one data source. The method further comprises generating a structured data file from the data. Generating the structured data file further comprises defining a plurality of attributes and price parameters related to the financial product, assigning a price conversion probability measure associated with the financial product and computing a contributed value measure associated with the financial product. The price conversion probability measure is a measure of a propensity of response to a price associated with the financial product. The contributed value measure is a function of the plurality of price parameters and the price conversion probability measure associated with the financial product. The method further comprises estimating the optimal price based on the plurality of attributes, the plurality of price parameters, the price conversion probability measure and the contributed value measure.

In a third embodiment, a method in a computer system for displaying a plurality of pages to enable a user to view information related to estimating an optimal price associated with a financial product is provided. The method comprises displaying an input screen for permitting the user to specify a plurality of attributes related to the financial product. The method further comprises displaying a selection screen for permitting the user to specify values for a plurality of price parameters and a price conversion probability measure associated with the financial product and a simulation screen for permitting the user to select a business measure parameter and at least one of the plurality of attributes associated with the financial product. Then, an output screen is displayed to the user for viewing the optimal price associated with the financial product. The optimal price is estimated based on the plurality of attributes, the plurality of price parameters, the price conversion probability measure and the business measure parameter specified by the user.

BRIEF DESCRIPTION OF THE DRAWINGS

FIGS. 7A-7D show various screen displays that may be presented to a user of the optimal price estimation system as it operates in the manner described with reference to FIGS. 1-6.

DETAILED DESCRIPTION OF THE INVENTION

Figure 1:
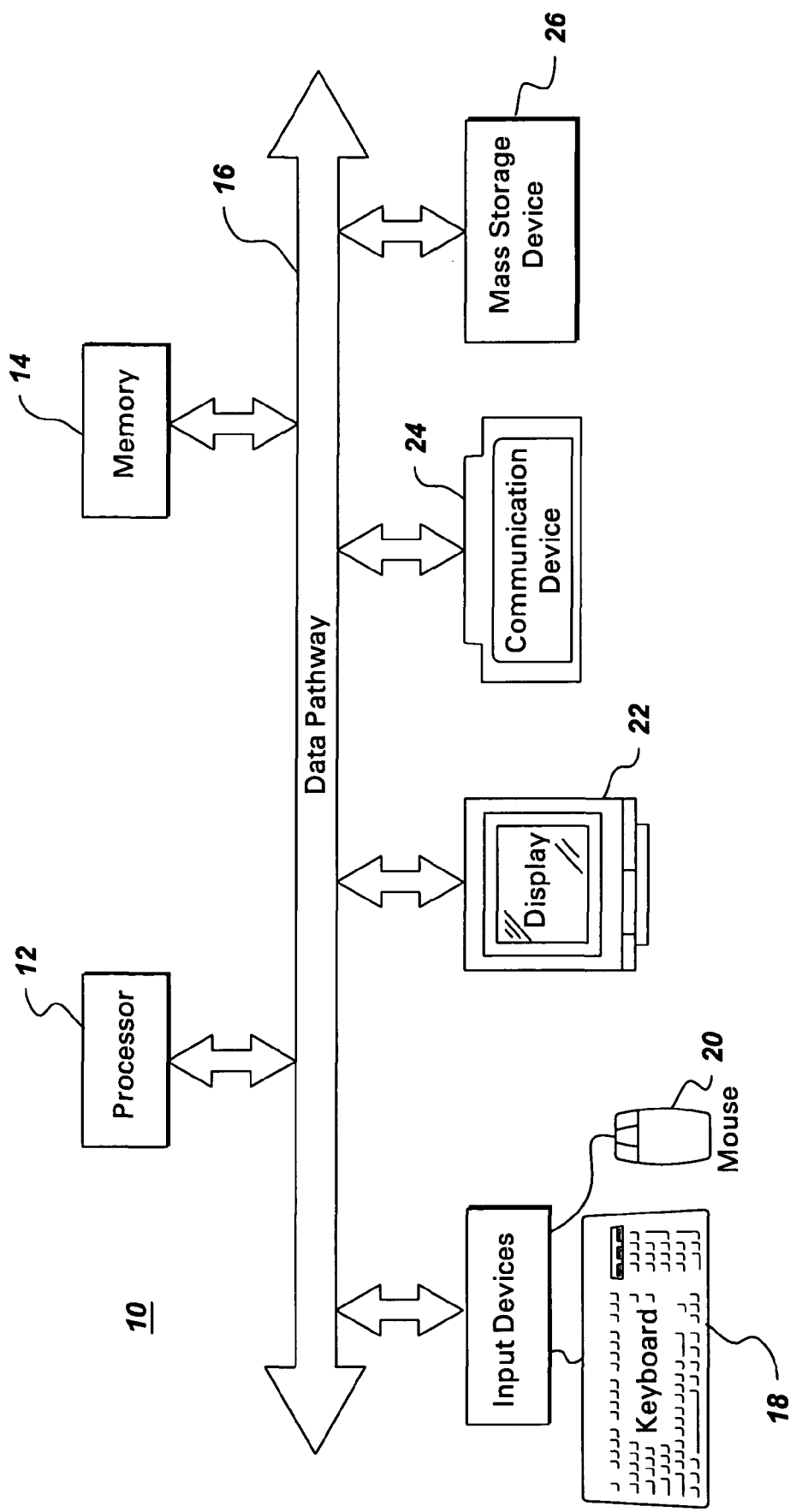
FIG. 1 shows a schematic of a general-purpose computer system, in which an optimal price estimation system for estimating the optimal price of a financial product operates.

FIG. 1 shows a schematic of a general-purpose computer system 10 in which an optimal price estimation system for estimating the optimal price of a financial product operates. The computer system 10 generally comprises at least one processor 12, a memory 14, input/output devices 15, and data pathways (e.g., buses) 16 connecting the processor, memory and input/output devices.

The computer system 10 may be in communication with one or more data sources comprising data related to the financial product, using a system such as the Internet; however, any suitable communication network might be used. In the present embodiment, the financial product comprises items such as consumer loans, credit cards, insurance policies, mortgages or sales finance and the data sources comprise consumer finance markets and marketing campaigns. Further, it is not necessary that the data from the data sources be obtained from a network. For example, the data might be provided on a weekly basis on compact discs (CDs) that are mailed.

The processor 12 accepts instructions and data from the memory 14 and performs various data processing functions of the system 10 such as data extraction, data definition and optimal price estimation. The processor 12 includes an arithmetic logic unit (ALU) that performs arithmetic and logical operations and a control unit that extracts instructions from memory 14 and decodes and executes them, calling on the ALU when necessary.

The memory 14 stores a variety of data computed by the various data processing functions of the system 10, such as customer information, account information and transaction information related to customers associated with the financial product. The memory 14 generally includes a random-access memory (RAM) and a read-only memory (ROM); however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices. The information in the memory 14 might be conveyed to a human user through the input/output devices, and data pathways (e.g., buses) 16, in some other suitable manner.

The input/output devices 15 may comprise a keyboard 18 and a mouse 20 that enter data and instructions into the computer system 10. Also, a display or user interface 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, or Digital Subscriber Line (DSL) adapter, enables the computer system 10 to access other computers and resources on a network such as a LAN or a wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media.

The above-described computer system 10 can take the form of a hand-held digital computer, personal digital assistant computer, notebook computer, personal computer, workstation, mini-computer, mainframe computer or supercomputer.

Figure 2:
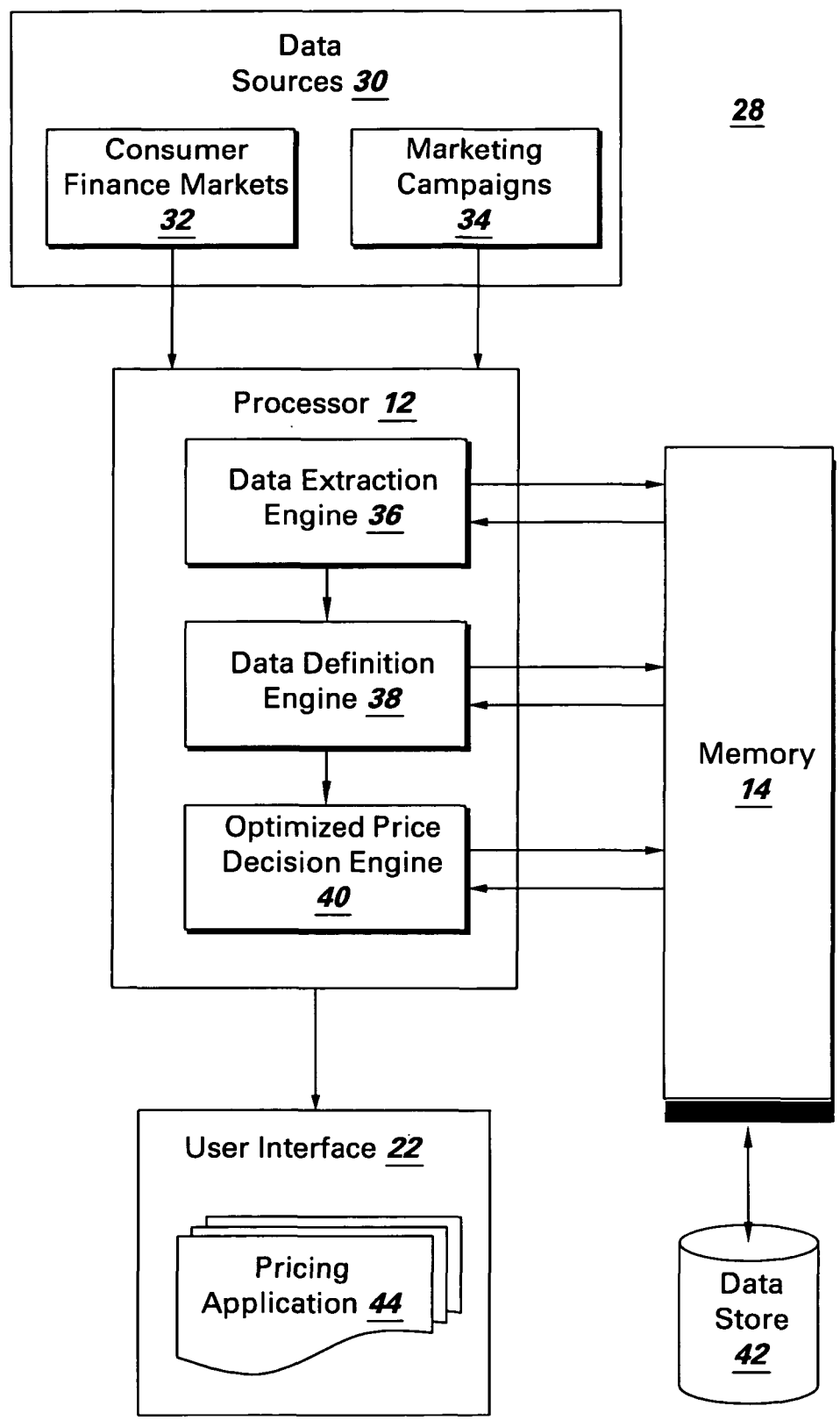
FIG. 2 shows a top-level component architecture diagram of an optimal price estimation system that operates on the computer system of FIG. 1.

FIG. 2 shows a top-level component architecture diagram of an optimal price estimation system 28 that operates on the computer system 10 of FIG. 1. As shown in FIG. 2, the optimal price estimation system 28 comprises data sources 30, a processor 12, a memory 14 and a user interface 22. The processor 12 comprises a data extraction engine 36, a data definition engine 38 and an optimized price decision engine 40, the memory 14 comprises a data store 42 and the user interface 22 comprises a pricing application 44. One of ordinary skill in the art will recognize that the optimal price estimation system 28 is not necessarily limited to these elements. It is possible that the optimal price estimation system 28 may have additional elements or fewer elements than what FIG. 2 shows.

The data extraction engine 36 extracts data relevant to the financial product from the data sources 30 and stores the data in the data store 42. In one embodiment of the invention, the data sources 30 comprise consumer finance markets 32 and marketing campaigns 34. Consumer finance markets 32 typically comprise data related to demographics of market constituents and account information on previously subscribed financial products, transaction and behavioral information associated with market constituents and response of market constituents to endogenous and exogenous stimuli. Marketing campaigns 34 typically comprise results of price testing campaigns, promotional campaigns, cross sell and up sell campaigns etc. The data definition engine 38 generates a structured data file from the data extracted by the data extraction engine 36. In the present embodiment, the structured data file comprises attributes and price parameters related to the financial product as will be described in greater detail below. The optimized price decision engine 40 then estimates the optimal price associated with the financial product based on the attributes and price parameters. The pricing application 44 comprises a plurality of visual displays or screen displays related to the process of optimal price estimation that may be presented to a user of the optimal price estimation system 28. FIGS. 3-7 describe in greater detail, the functioning of the data extraction engine 36, data definition engine 38 and the optimized price decision engine 40.

Figure 3:
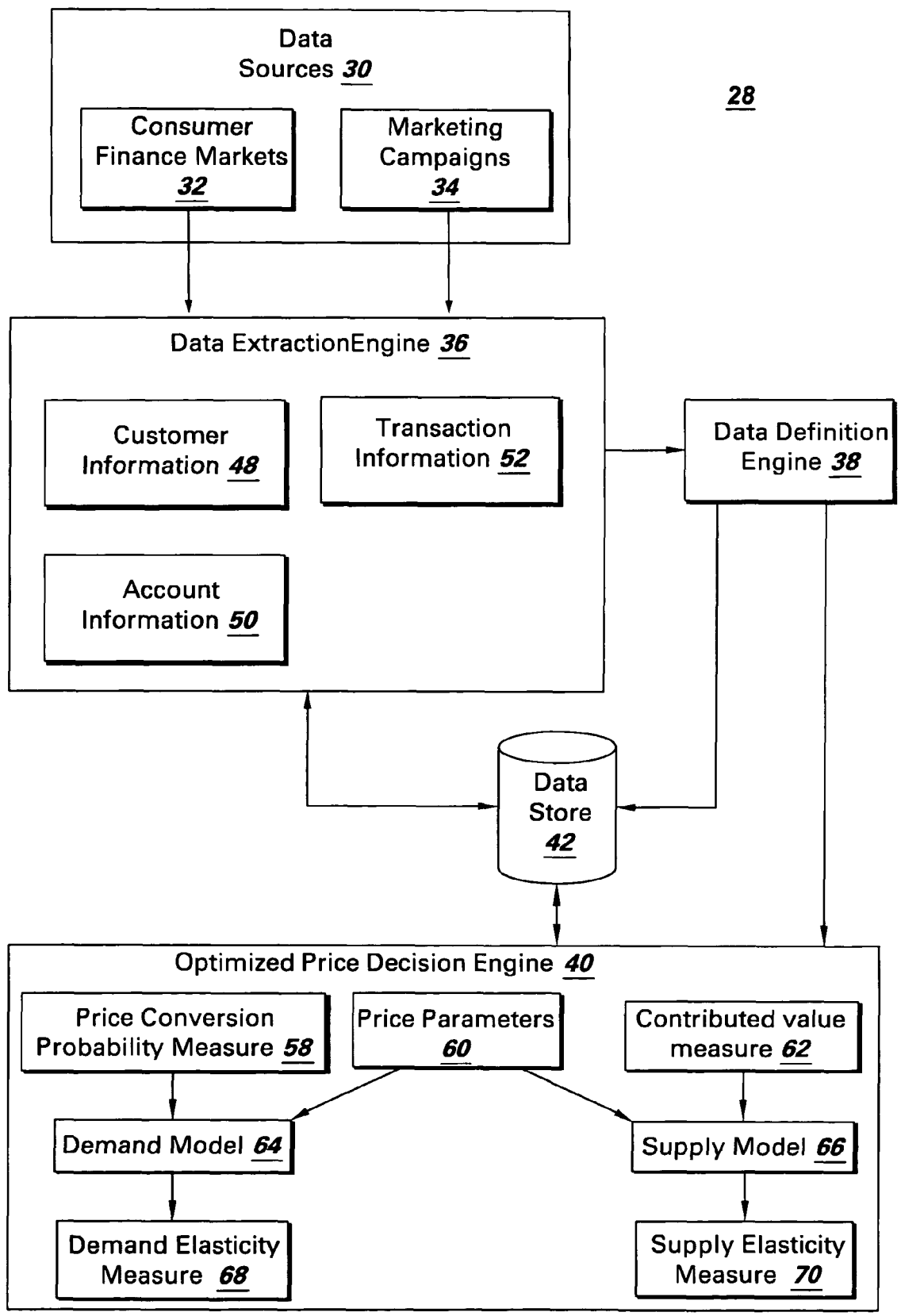
FIG. 3 is a more detailed view of the optimal price estimation system for estimating the optimal price associated with a financial product that is shown in FIG. 2.

FIG. 3 is a more detailed view of the optimal price estimation system 28 for estimating the optimal price associated with a financial product shown in FIG. 2. In an exemplary embodiment, the optimal price estimation system 28 is used for estimating the optimal interest rate on a financial loan. However, one of ordinary skill in the art will recognize that the optimal price estimation system 28 is not limited to the estimation of optimal interest rates on a financial loan and may be used to estimate the optimal price of any financial product such as for example interest rates for credit cards or premium rates for insurance policies.

Referring to FIG. 3, the data extraction engine 36 extracts data relevant to the financial product from the data sources 30 and stores it in the data store 42. In embodiments of the present invention, the data comprises customer information 48, account information 50 and transaction information 52. The data definition engine 38 generates a structured data file from the data extracted by the data extraction engine 36. That is, the data definition engine 38 creates a structured data file from the customer information 48, the account information 50 and the transaction information 52 stored in the data store 42. According to one embodiment, the structured data file consists of records comprising customer, account and transaction attributes as described in the following paragraphs. The structured data file functions as a unified global data definition dictionary for the attributes related to the financial product and across a plurality of financial products and financial markets.

The customer information 48 is defined by customer attributes related to the demographic characteristics and behavioral information of customers associated with the financial product. The attributes comprise, for example, a customer identification key, a customer type (whether the customer is an individual or a corporate entity) and the sex, age, name, occupation, nationality, marital status, etc. of the customer. The account information 50 is defined by account attributes related to the account details of a customer associated with the financial product (or any other previous financial product subscribed by the customer), such as, for example, an account identification key, the available credit limit, the account balance, the term of the loan, the loan installment amount, the remaining term of the loan etc. The transaction information 52 is defined by price parameters associated with the financial product such as, for example, the total loan amount, a price rate parameter or the annual percentage rate (APR) on the loan, a price conversion probability measure, a price conversion rate, a price term parameter, a price processing parameter, a price conversion date, a cost of funds parameter etc.

In accordance with one embodiment, the price conversion probability measure is a measure of a propensity of response to a price or selling rate associated with the financial product. That is, the price conversion probability measure is a function of the demand associated with a particular price related to the financial product. In a specific embodiment, the price conversion probability measure is expressed as a probability value of either a 1 or a 0, wherein a value of 1 is assigned to a customer who accepts the financial product at an offered price, in this exemplary embodiment, an offered interest rate on the loan. The price conversion rate is the rate of conversion at a particular price associated with the financial product. In a specific embodiment of the invention, the price conversion rate is computed as a ratio of the number of customers who accepted the financial product at the offered price (interest rate) to the total population of customers under consideration. The price rate parameter is the interest rate (APR) that the customer pays for the use of the financial product. In the exemplary embodiment where the financial product involves a loan, the price term parameter is the term of the loan, and the price processing parameter is the fee or financial charge associated with the loan. The price parameters also comprise one or more business measure parameters associated with the financial product, such as for example, a contributed value measure, a volume measure, and an interest volume measure associated with the financial product. In a specific embodiment of the invention, the business measure parameter is a contributed value measure associated with the financial product. The contributed value measure is based on whether a customer converted or accepted the financial product at the offered interest rate and is computed based on the total loan amount, the price conversion probability measure, the price rate parameter, the price term parameter, the price processing parameter and the cost of funds parameter.

The optimized price decision engine 40 then estimates the optimal price associated with the financial product based on the attributes, the price parameters, the price conversion probability measure, and the contributed value measure parameter. The following paragraphs describe in greater detail, the process of optimal price estimation by the optimized price decision engine 40.

The optimized price decision engine initially computes price elasticity measures based on a demand model 64 and a supply model 66. In a specific embodiment of the present invention, the demand model 64 computes a demand elasticity measure 68 based on the price conversion probability measure and the supply model 66 computes a supply elasticity measure 70 based on the contributed value measure. According to one embodiment, the optimized price decision engine 40 formulates a modeling and a statistical testing paradigm that captures the trade off between the demand or the price conversion probability measure and the supply or the contributed value measure. In particular, the optimized price decision engine utilizes a regression model as described below to estimate the optimal price.

The following paragraphs describe in greater detail, the optimal pricing and price testing strategy formulated by the optimized price decision engine 40 to estimate the optimal price. The optimal pricing and price testing strategy is formulated based on a functioning market with current levels of price, demand and contributed value.

Let r = an optimal price associated with the financial product;

$r_0$ = is the current price associated with the financial product;

$\pi$ = optimal price conversion rate;

$\pi_0$ = current price conversion rate;

v = optimal contributed value measure from price conversion $v_0$ = current contributed value measure from price conversion $\beta_c$ = price elasticity measure for price conversion at current price $\beta_v$ = price elasticity measure for contributed value measure at current price The optimal price conversion rate $\pi$ and the optimal contributed value measure from price conversion v are related to the optimal price according to the relations:

$$\log \pi = f_c(\log r) \quad (1)$$

$$\log v = f_v(\log r) \quad (2)$$

wherein $f_c$, $f_v$, and r are functions determined from the attributes and price parameters, defined in the structured data file, wherein, in particular c represents the price conversion probability measure, v represents the total loan amount associated with the financial product and r represents the price rate (APR) parameter.

Using the above regression equations (1) and (2) obtained for $\log \pi$ and $\log v$, the price elasticity measures are derived as follows:

$$\beta_c = -\frac{d\log\pi}{d\log r}\bigg|_{(r_0,\pi_0)} \quad \text{and} \quad (3)$$

$$\beta_v = \frac{d\log v}{d\log r}\bigg|_{(r_0,v_0)} \quad (4)$$

where $\beta_c$ represents the demand elasticity measure and $\beta_v$ represents the supply elasticity measure. As will be appreciated by those skilled in the art, the price elasticity measures measure the responsiveness of the price conversion rate and the contributed value measure to changes in price, and the optimal price is the value of r which equalizes the elasticity measures $\beta_c$ and $\beta_v$. Using the above values for $\beta_c$ and $\beta_v$, the optimal price conversion rate that maximizes the price (that is, results in the optimal price) is determined by the equation:

$$\log \pi = \log \pi_0 - \beta_c (\log r - \log r_0) \quad (5)$$

Similarly, the optimal contributed value measure resulting from price conversion that maximizes the price (that is, results in the optimal price) is determined by the equation:

$$\log v = \log v_0 + \beta_v (\log r - \log r_0) \quad (6)$$

In an alternate embodiment of the invention, the income or expected contributed value realized from the financial product is determined by calculating the product of $\pi$ and v, $\pi v$ and is determined by the equation:

$$\pi v \approx \pi_0 v_0 \left(1 - \beta_c \frac{\Delta r}{r_0}\right)\left(1 + \beta_v \frac{\Delta r}{r_0}\right) \quad (7)$$

where $\Delta r = r - r_0$ is the change in price.

The change in price that maximizes the income is given by the equation:

$$\Delta r = r_0 \frac{1}{2}\left(\frac{1}{\beta_c} - \frac{1}{\beta_v}\right) \quad (8)$$

In addition, a measure of efficiency of the current market is computed based on a ratio of the contributed value measure at the current price from the optimal price and is determined by the equation $$\eta = \frac{4\beta_c \beta_v}{(\beta_c + \beta_v)^2} \quad (9)$$

In summary, the process of optimal price estimation and optimal price testing by the optimized price decision engine 40 for a financial product initially comprises estimating price elasticity measures $\beta_c$ and $\beta_v$ for a price conversion rate and a contributed value measure, from the attributes and price parameters defined in the structured data file. Then, a test for elasticity equalization is performed. If the elasticity measures $\beta_c$ and $\beta_v$ are not equalized, another price test is performed to estimate the price elasticity measures. Once, the price elasticity measures are optimized, the current price is treated as the optimal price.

Figure 4:
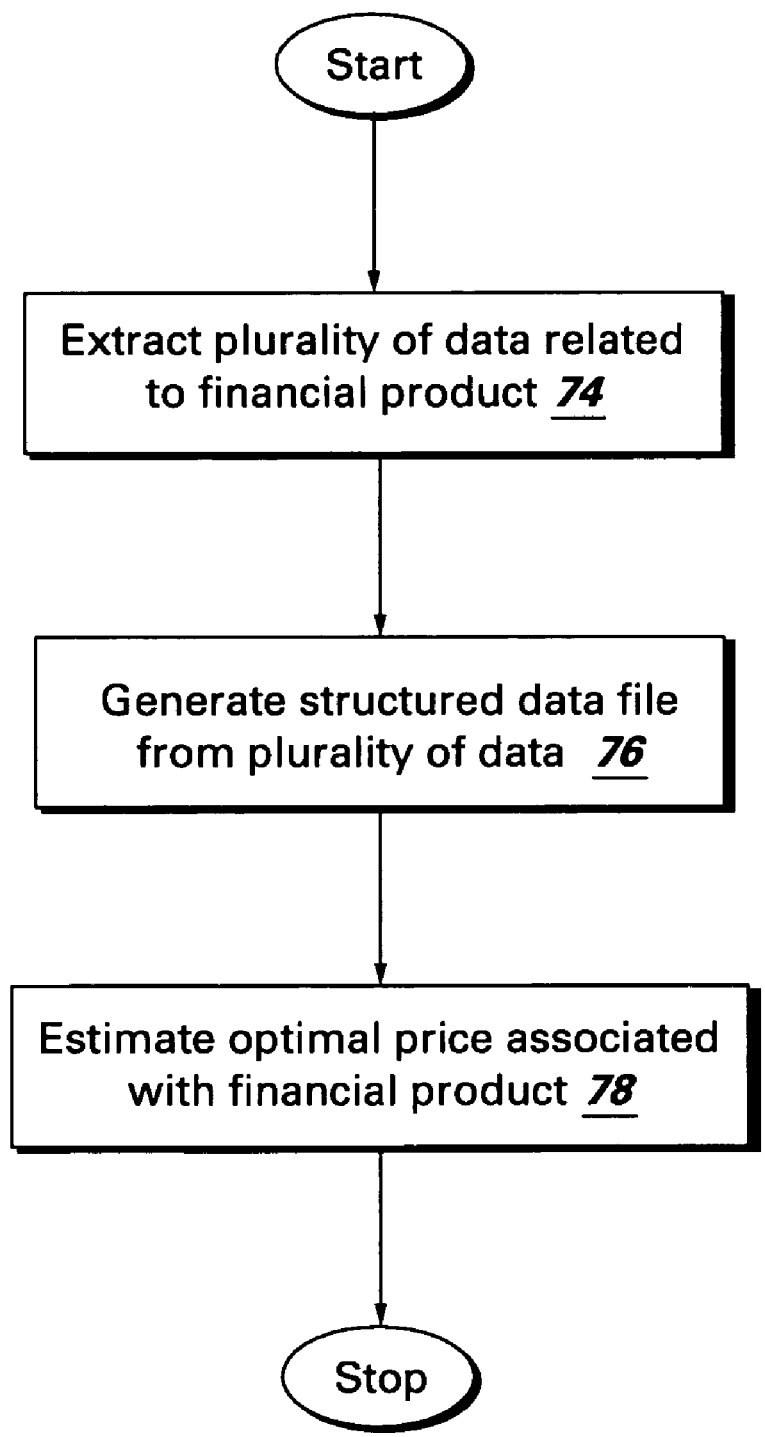
FIG. 4 is a flowchart describing the overall process of estimating the optimal price of a financial product.
Figure 5:
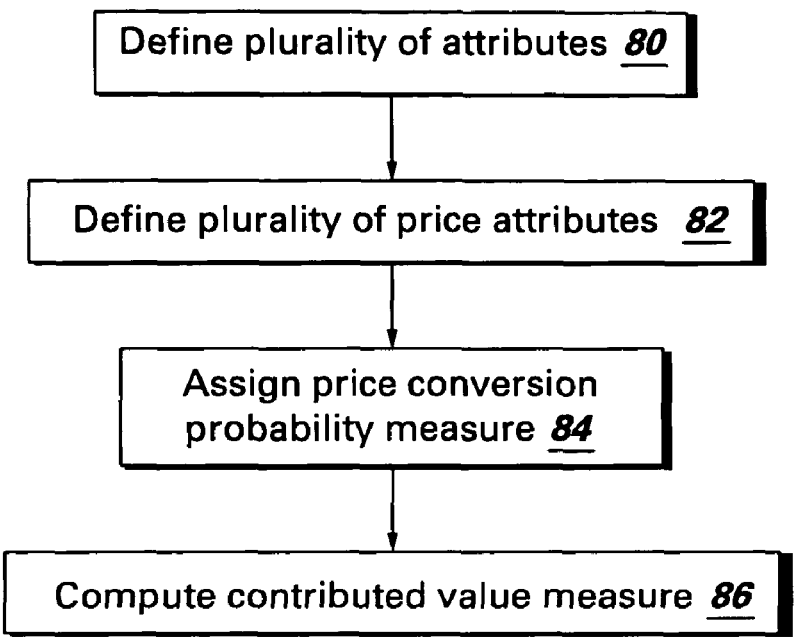
FIG. 5 is a flowchart describing in greater detail, the "generate structured data file" step shown in FIG. 4.
Figure 6:
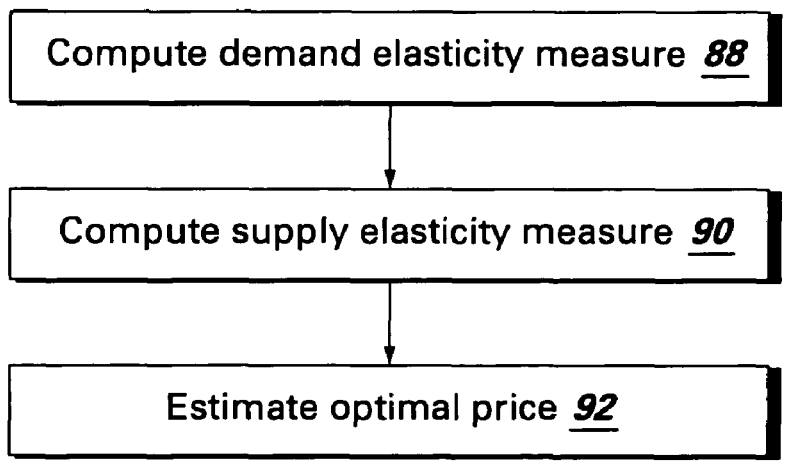
FIG. 6 is a flowchart describing in greater detail, the "estimate optimal price" step shown in FIG. 4.

FIG. 4 is a flowchart describing the overall process of estimating the optimal price of a financial product. In step 74, data related to the financial product is extracted from at least one of the data sources. As described above, the data comprises customer information 48, account information 50 and transaction information 52 and the data source comprises consumer finance markets 32 and marketing campaigns 34. In step 76, a structured data file is generated from the data. As described above, the structured data file comprises attributes and price parameters related to the financial product. In step 78, the optimal price of the financial product is estimated. FIGS. 5 and 6 describe in greater detail, the process of estimating the optimal price of a financial product.

FIG. 5 is a flowchart describing in greater detail, the "generate structured data file" step 76 of FIG. 4. In step 80, attributes related to the financial product are defined. As described above, the attributes comprise customer attributes, account attributes and transaction attributes associated with the financial product. In step 82, price parameters associated with the financial product are defined. As described above, the price parameters comprise a price conversion rate parameter, a price rate parameter, a price term parameter, a price processing parameter, a total loan amount and a cost of funds parameter related to the financial product. In step 84, a price conversion probability measure is assigned. The price conversion probability measure is a measure of a propensity of response to a price associated with the financial product. In step 86, a contributed value measure associated with the financial product is computed. The contributed value is a function of the price parameters and the price conversion probability measure associated with the financial product.

FIG. 6 is a flowchart describing in greater detail, the "estimate optimal price" step 78 of FIG. 4. In step 88, a demand elasticity measure associated with the financial product is computed. As described above, in a specific embodiment of the invention, the demand elasticity measure is a function of the price conversion probability measure, and is derived using equation (3). In step 90, a supply elasticity measure associated with the financial product is computed. As described above, in a specific embodiment of the invention, the supply elasticity measure is a function of the contributed value measure associated with the financial product, and is derived using equation (4). In step 92, the optimal price of the financial product is estimated based on the attributes, the price parameters, the price conversion probability measure and the contributed value measure, and is estimated using equations (5) and (6) as described above.

Figure 7D:
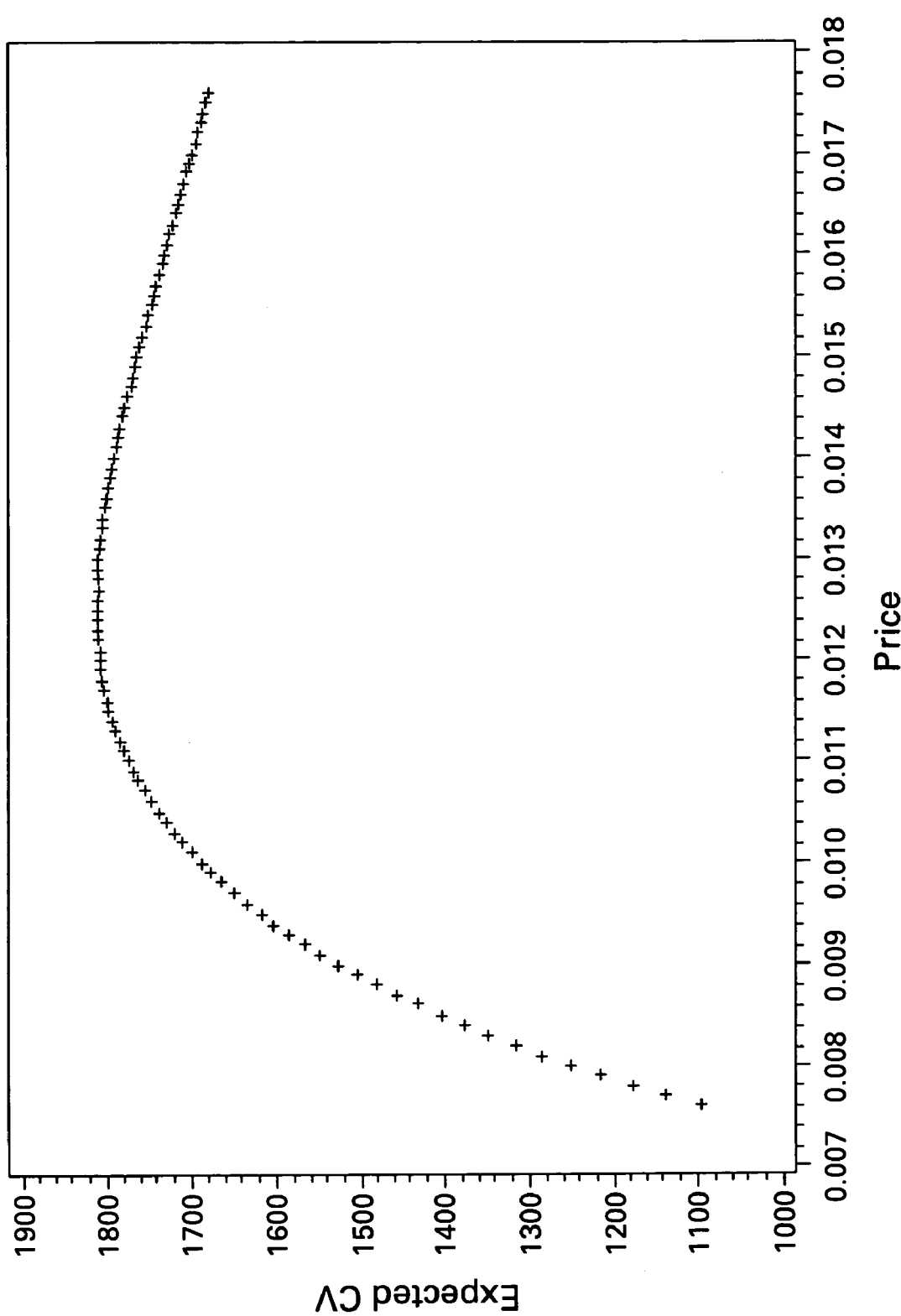

FIG. 7A- show various screen displays that may be presented to a user of the optimal price estimation system 28 as it operates in the manner described with reference to FIGS. 1-6. FIGS. 7A-7D enable a user to view information related to estimating an optimal price associated with a financial product. These screen displays are for illustrative purposes only and are not exhaustive of other types of displays that can be presented to a user for this embodiment or the displays that can be presented in other possible embodiments. Also, the actual look and feel of the displays can be slightly or substantially changed during implementation.

FIG. 7A shows a screen display of an input screen for permitting a user to specify attributes related to the financial product. In FIG. 7A, the user can view and edit the attributes related to the financial product. One of ordinary skill in the art will recognize that the input screen display is for illustrative purposes and is not meant to limit any other additional attributes that may be displayed to the user. As indicated in FIG. 7A, the input screen enables the user to remove or delete a variable, add a variable or modify a variable definition. As used herein, the term variable refers to an attribute. Also, as indicated, the input screen of FIG. 7A allows the user to specify data types related to the attributes. On user selection of the remove, add or modify button, a link is made to the structured data file and the appropriate variable or attribute from the structured data file is retrieved and displayed to the user.

FIG. 7B shows a screen display of a selection screen for permitting a user to specify values for price parameters associated with the financial product. As indicated in the screen display of FIG. 7B, the "link field" enables the selection of the parameters to be populated in the drop down list boxes. The link field is a pointer to the structured data file and on user selection of the link field, the parameters are retrieved from the structured data file and displayed in the drop down list boxes. The conversion flag is a variable whose values are either 1 or 0. Also, as described above, the price parameters comprise a price conversion rate parameter, a price rate parameter, a price term parameter, a price processing parameter, a total loan amount and a cost of funds parameter. As shown in FIG. 7B, the "APR" field refers to the price rate parameter, the "APR Range in %" refers to typical range values assigned to the APR field and is based on market conditions and market competition, the "Term after conversion" field refers to the price term parameter after price conversion, and the "Fee income" field refers to the price processing parameter. In addition, the screen display of FIG. 7B comprises a "Volume after conversion" field wherein the volume after conversion refers to the total loan amount generated after price conversion and a "Cost of funds" field, wherein the cost of funds refers to the price paid for raising capital resources for the financial product.

FIG. 7C shows a screen display of a simulation screen for permitting the user to specify a business measure parameter and at least one of the attributes associated with the financial product. As shown in FIG. 7C, the simulation screen comprises a "Select business measure" field, a "Select test variable" field, a "confidence limit" field, a "Select variables for model" field, and a "Select segmentation variable" field. On selection of the above fields, the list of business measures, test variables, model variables and segmentation variables are retrieved from the structured data file and then displayed to the user. As described above, the "business measure" parameter comprises a contributed value measure related to the financial product. However the business measures may also comprise a volume measure, and an interest volume measure related to the financial product. The "test variable" or parameter is the price assignment or the APR value, and the model variables are one or more customer attributes and account attributes associated with the financial product. The segmentation variable comprises one or more of the customer attributes and is a reflection of demographic characteristics related to customers associated with the financial product. In addition to the above fields, as indicated in FIG. 7C, the simulation screen comprises a "build model" button. On the selection of the "build model" button by the user, the selected business measure parameter, the test variables, the modeling variables, the segmentation variables and the confidence limit variables selected by the user are input into the optimized price decision engine to estimate the optimal price associated with the financial product. One of ordinary skill in the art will recognize that the simulation screen display is for illustrative purposes and is not meant to limit any additional attributes that may be displayed to the user for selection purposes.

FIG. 7D shows a screen display of an output screen for permitting the user to view the optimal price associated with the financial product. In an exemplary embodiment, the output screen of FIG. 7D is a graphical representation of the effect of price rates associated with the financial product on the business measure, in this case, the contributed value measure and the optimal price rate at which the contributed value measure is maximized.

The foregoing flow charts, block diagrams and screen shots of this disclosure show the functionality and operation of the optimal price estimation system 28. In this regard, each block/component represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added. Furthermore, the functions can be implemented in programming languages such as C, C++ or JAVA; however, other languages can also be used such as Perl, Javasript and Visual Basic. In addition, Application Program Interfaces (API's) provided by software packages such as SAS or MATLAB may also be used for implementing the functions.

The various embodiments described above comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a method, system and computer product for estimating the optimal price of a financial product. While the invention has been particularly shown and described in conjunction with a preferred embodiment thereof, it will be appreciated that variations and modifications can be effected by a person of ordinary skill in the art without and departing from the scope of the invention.

The invention claimed is:

1. A computer storage device readable by a machine, tangibly embodying a program of instructions executable by the machine to perform method steps for estimating an optimal price of a financial product, the method steps comprising:
   extracting data related to the financial product from at least one data source;
   generating a structured data file from the data, wherein generating the structured data file comprises defining a plurality of attributes and a plurality of price parameters related to the financial product, and wherein the plurality of price parameters comprise a price conversion probability measure and a business measure parameter associated with the financial product; and
   estimating the optimal price associated with the financial product based on the plurality of attributes, the plurality of price parameters, the price conversion probability measure and the business measure parameter.

2. The computer storage device of claim 1, wherein the financial product comprises at least one of loans, credit cards, insurance policies, mortgages and sales fmance.

3. The computer storage device of claim 1, wherein the at least one data source comprises information received from consumer finance markets or marketing campaigns.

4. The computer storage device of claim 1, wherein the extracting comprises automatically searching and downloading the data from the at least one data source at predetermined time intervals.

5. The computer storage device of claim 1, wherein the plurality of attributes comprise customer attributes and account attributes associated with the financial product.

6. The computer storage device of claim 1, wherein the business measure parameter comprises at least one of a contributed value measure, a volume measure, and an interest volume measure associated with the financial product.

7. The computer storage device of claim 1, wherein the price conversion probability measure is a measure of a propensity of response to a price associated with the financial product.

8. The computer storage device of claim 1, wherein the plurality of price parameters further comprise a price conversion rate parameter, a price rate parameter, a price term parameter, and a price processing parameter associated with the financial product.

9. The computer storage device of claim 1, wherein estimating the optimal price further comprises computing a plurality of price elasticity measures associated with the financial product, wherein the plurality of price elasticity measures comprise a demand elasticity measure and a supply elasticity measure associated with the financial product.

10. The computer storage device of claim 9, wherein the demand elasticity measure is a function of the price conversion probability measure and the supply elasticity measure is a function of a contributed value measure associated with the financial product.

11. The computer storage device of claim 10, wherein the demand elasticity measure and the supply elasticity measure are estimated using a regression model.

12. A system for estimating an optimal price of a financial product comprising:
a first computer storage device readable by a first machine, tangibly embodying a program of instructions executable by the first machine to provide a data extraction engine configured to extract data relevant to the financial product from at least one data source;
a second computer storage device readable by a second machine, tangibly embodying a program of instructions executable by the second machine to provide a data definition engine configured to generate a structured data file from the data extracted from the data extraction engine, wherein the structured data file comprises a plurality of attributes and a plurality of price parameters related to the financial product; and wherein the plurality of price parameters comprise a price conversion probability measure and a business measure parameter associated with the financial product; and
a third computer storage device readable by a third machine, tangibly embodying a program of instructions executable by the third machine to provide an optimized price decision engine configured to estimate the optimal price associated with the financial product based on the plurality of attributes, the plurality of price parameters, the price conversion probability measure and the business measure parameter.

13. The system of claim 12, wherein the financial product comprises at least one of loans, credit cards, insurance policies, mortgages and sales finance.

14. The system of claim 12, wherein the at least one data source comprises information received from consumer finance markets or marketing campaigns.

15. The system of claim 12, wherein the data extraction engine is configured to automatically search and download the data from the at least one data source at predetermined time intervals.

16. The system of claim 12, wherein the plurality of attributes comprise customer attributes and account attributes associated with the financial product.

17. The system of claim 12, wherein the business measure parameter comprises at least one of a contributed value measure, a volume measure, and an interest volume measure associated with the financial product, and wherein the price conversion probability measure is a measure of a propensity of response to a price associated with the financial product.

18. The system of claim 12, wherein the plurality of price parameters further comprise a price conversion rate parameter, a price rate parameter, a price term parameter, and a price processing parameter associated with the financial product.

19. The system of claim 12, wherein the optimized price decision engine further comprises a demand model and a supply model, wherein the demand model is configured to compute a demand elasticity measure and the supply model is configured to compute a supply elasticity measure associated with the financial product.

20. The system of claim 19, wherein the demand elasticity measure is a function of the price conversion probability measure and the supply elasticity measure is a function of a contributed value measure associated with the financial product.

21. The system of claim 20, wherein the demand elasticity measure and the supply elasticity measure are estimated using a regression model.

22. A computer storage device readable by a machine, tangibly embodying a program of instructions executable by the machine to perform method steps for displaying a plurality of pages to enable a user to view information related to estimating an optimal price associated with a financial product, the method comprising:
displaying an input screen for permitting the user to specify a plurality of attributes related to the financial product;
receiving selections identifying a chosen plurality of attributes;
displaying a selection screen for permitting a user to specify values for a plurality of price parameters and a price conversion probability measure associated with the financial product;
receiving values for the plurality of price parameters and the price conversion probability measure;
displaying a simulation screen for permitting the user to select a business measure parameter and at least one of the plurality of attributes associated with the financial product;
receiving the business measure parameter and a value for each of the chosen plurality of attributes;
calculating an estimate of an optimal price associated with the financial product based on the values of the chosen plurality of attributes, the values of the each of the plurality of price parameters, the price conversion probability measure and the business measure parameter; and
displaying an output screen showing the calculated optimal price associated with the financial product.

23. The device of claim 22, wherein the input screen further comprises permitting the user to view and edit the plurality of attributes related to the financial product.

24. The device of claim 23, wherein the plurality of attributes comprise customer attributes and account attributes associated with the financial product.

25. The device of claim 22, wherein the plurality of price parameters comprise a price conversion rate parameter, a price rate parameter, a price term parameter, and a price processing parameter associated with the financial product.

26. The device of claim 22, wherein the business measure parameter comprises at least one of a contributed value measure, a volume measure, and an interest volume measure associated with the financial product.

27. The device of claim 22, wherein the price conversion probability measure is a measure of a propensity of response to a price associated with the financial product.

28. The device of claim 22, wherein the simulation screen further comprises permitting the user to select a segmentation parameter associated with the financial product.

29. The device of claim 28, wherein the segmentation parameter is a reflection of a plurality of demographic characteristics related to a plurality of customers associated with the financial product.

30. The device of claim 22, wherein the plurality of attributes, the plurality of price parameters, the price conversion probability measure and the business measure parameter specified by the user are provided to an optimized price decision engine, wherein the optimized price decision engine estimates the optimal price based on the plurality of attributes, the plurality of price parameters, the price conversion probability measure, the business measure parameter, and the segmentation parameter.

31. The device of claim 30, wherein the optimized price decision engine utilizes a regression model to estimate the optimal price.

32. The device of claim 22, wherein the output screen further comprises displaying a screen for viewing the effect of the estimated optimal price on the business measure parameter graphically.

* * * * *